United States Patent
Ke

(10) Patent No.: US 9,483,212 B2
(45) Date of Patent: Nov. 1, 2016

(54) NON-VOLATILE MEMORY DEVICES AND CONTROL METHODS THEREFOR

(71) Applicant: Silicon Motion, Inc., Jhubei, Hsinchu County (TW)

(72) Inventor: Kuan-Yu Ke, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 51 days.

(21) Appl. No.: 14/614,444

(22) Filed: Feb. 5, 2015

(65) Prior Publication Data
US 2016/0103631 A1 Apr. 14, 2016

(30) Foreign Application Priority Data
Oct. 13, 2014 (TW) .............................. 103135327 A

(51) Int. Cl.
*G06F 3/06* (2006.01)

(52) U.S. Cl.
CPC ............. *G06F 3/0679* (2013.01); *G06F 3/064* (2013.01); *G06F 3/0619* (2013.01); *G06F 3/0647* (2013.01)

(58) Field of Classification Search
CPC .... G06F 3/0679; G06F 3/0619; G06F 3/064; G06F 3/0647
USPC ............... 711/103, 154, 156, 158, 165, 221; 365/185.33
See application file for complete search history.

(56) References Cited

U.S. PATENT DOCUMENTS

| 7,475,184 | B2 * | 1/2009 | Lee | G06F 9/4403 711/103 |
| 7,532,510 | B2 * | 5/2009 | Lee | G11C 7/1021 365/185.11 |
| 7,941,593 | B2 * | 5/2011 | Lee | G06F 9/4403 711/103 |
| 8,068,363 | B2 * | 11/2011 | Lee | G11C 16/26 365/185.11 |
| 8,078,794 | B2 * | 12/2011 | Lee | G06F 3/0613 711/103 |
| 8,090,900 | B2 * | 1/2012 | Cheng | G06F 12/0246 711/103 |

(Continued)

FOREIGN PATENT DOCUMENTS

TW 201303588 1/2013

*Primary Examiner* — Stephen Elmore
(74) *Attorney, Agent, or Firm* — McClure, Qualey & Rodack, LLP

(57) ABSTRACT

A non-volatile memory device is provided. The non-volatile memory device includes a non-volatile memory, a connection interface, and a controller. The non-volatile memory is divided into a plurality of physical blocks. Each physical block is divided into a plurality of physical pages. The connection interface is connected to a host. The controller is connected to the connection interface. When the controller performs a block-reconfiguration operation, the controller re-adjusts a position in the physical blocks where data is disposed to obtain a usable physical block. Movement of one portion of the data related to the block-reconfiguration operation is performed when the controller operates an initial operation. Movement of another portion of the data related to the block-reconfiguration operation is performed when the controller processes a read command from the host.

20 Claims, 14 Drawing Sheets

(56) References Cited

U.S. PATENT DOCUMENTS

| | | | | |
|---|---|---|---|---|
| 8,111,559 B2* | 2/2012 | Kwon | G11C 7/04 | 365/148 |
| 8,156,277 B2* | 4/2012 | Kitahara | G06F 12/0246 | 710/26 |
| 8,307,189 B2* | 11/2012 | Yamauchi | G06F 11/004 | 711/165 |
| 8,417,988 B2* | 4/2013 | Kim | G11C 29/82 | 711/103 |
| 8,489,942 B1* | 7/2013 | Wong | G06F 12/0246 | 365/185.33 |
| 8,554,988 B2* | 10/2013 | Kitahara | G06F 12/0246 | 710/26 |
| 8,725,936 B2* | 5/2014 | Oikawa | G06F 11/004 | 711/103 |
| 8,910,109 B1* | 12/2014 | Orthner | H03K 19/003 | 110/116 |
| 8,966,330 B1* | 2/2015 | Raghu | G11C 16/10 | 714/721 |
| 9,142,324 B2* | 9/2015 | Raghu | G11C 16/10 | |
| 9,143,128 B2* | 9/2015 | Huang | G06F 17/5054 | |
| 2009/0259799 A1* | 10/2009 | Wong | G06F 12/0207 | 711/103 |
| 2010/0325351 A1* | 12/2010 | Bennett | G06F 12/0246 | 711/103 |
| 2013/0019049 A1 | 1/2013 | Yeh | | |
| 2013/0067139 A1* | 3/2013 | Yamamoto | G06F 3/0608 | 711/103 |

* cited by examiner

| LB | PB |
|---|---|
| 435 | 221 |
| 212 | 779 |
| 112 | 832 |
| 554 | 21 |

FIG. 6

NON-VOLATILE MEMORY DEVICES AND CONTROL METHODS THEREFOR

CROSS REFERENCE TO RELATED APPLICATIONS

This application claims priority of Taiwan Patent Application No. 103135327, filed on Oct. 13, 2014, the entirety of which is incorporated by reference herein.

BACKGROUND OF THE INVENTION

1. Field of the Invention

The invention relates to a non-volatile memory devices and a controller, and more particularly to a non-volatile memory devices and a controller which have a recovery function performed after an abnormal status occurs.

2. Description of the Related Art

In recent years, non-volatile memories, such as flash memories, have been increasingly developed and applied for various electronic devices. At present, non-volatile memories are developed with increasing capacity and improved operation. When a large amount of data is stored in non-volatile memories, it becomes more important to provide an effective and reliable recovery machine for abnormal statuses, such as power being off suddenly, in order to ensure the accuracy and security for the stored data.

During recovery processes, appearance of insufficient space may sometimes occur. In this situation, physical blocks are required to be reconfigured. For access efficiency, each page of the physical blocks may not be filled. Thus, when the physical blocks are reconfigured, the pages are moved to obtain additional space. For example, pages of several physical blocks are moved to the same physical block to obtain a new physical block. With requirement for higher storage speed, the reconfiguration operation is requested to be finished in a short time. However, speeding up the storage speed usually leads to increased cost. Thus, how to provide a better space-reconfiguration method becomes more important and ponderable.

BRIEF SUMMARY OF THE INVENTION

An exemplary embodiment of a non-volatile memory device is provided. The non-volatile memory device comprises a non-volatile memory, a connection interface, and a controller. The non-volatile memory is divided into a plurality of physical blocks. Each physical block is divided into a plurality of physical pages. The connection interface is connected to a host. The controller is connected to the connection interface. When the controller performs a block-reconfiguration operation, the controller re-adjusts a position in the physical blocks where data is disposed to obtain a usable physical block. Movement of one portion of the data related to the block-reconfiguration operation is performed when the controller operates an initial operation. Movement of another portion of the data related to the block-reconfiguration operation is performed when the controller processes a read command from the host.

An exemplary embodiment of a control method of a controller for a non-volatile memory device is provided. The non-volatile memory device comprises a non-volatile memory and connection interface. The non-volatile memory is divided into a plurality of physical blocks. Each physical block is divided into a plurality of physical pages. The connection interface is connected to a host. When the controller controls the non-volatile memory device, the control method comprises steps of when the controller performs a block-reconfiguration operation, re-adjusting a position in the physical blocks where data is disposed to obtain a usable physical block, and performing movement of one portion of the data related to the block-reconfiguration operation when the controller operates an initial operation, and performing movement of another portion of the data related to the block-reconfiguration operation when the controller processes a read command from the host.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6 shows a schematic view showing correlation between logic blocks and physical blocks according to another exemplary embodiment;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

An embodiment of the invention provides a non-volatile memory device and a controller therein. The non-volatile memory device is implemented, for example, by an external flash device or a flash external hard disk. The non-volatile memory device can be connected to a host through a connection interface, such as USB (universal serial bus)or SATA (Serial Advanced technology attachment) to serve as a storage device of the host. The non-volatile memory device comprises one or more non-volatile memory cells and also comprises one or more random-access memories or conventional magnetic hard disk. The host transmits access instructions, such as read or write instructions, to the non-volatile memory device via the connection interface. The controller performs operations to the memory cells according to these read or write instructions.

In order to speed up entire access speed or reduce wastage of flash memories, some random-access memories are configured as caches or buffers. In other words, some data is not written directly into the flash memories, but temporarily into the random-access memories. In another manner, single-level cell (SLC) flash memories with higher speed are configured as the first stage cache, and cheaper multi-level cell (MLC) flash memories are configured to practically store a large amount of data.

These implementations may provide some measure of efficiency. However, when abnormal statuses occurs, such when the user takes off the non-volatile memory device from the host without appropriate measure while the power is off suddenly, a recovery operation, such as re-writing, may be performed for some data.

In an embodiment of the recovery operation performed after the abnormal statue occurs, for unstable data pages, such as data pages which belong to the same hardware circuit element or region with other data pages and are influenced by each other, in order to avoid extension of errors, the valid data pages are copied into another physical block, and the original physical block is not used any more. The embodiment also includes a process in which, when it is determined which one is valid data, only a portion of the data is read and it is determined whether the read portion of the data is valid data according to a statistics value for speeding up the determination.

In the following, a structure applied to the above embodiments is provided. Then, the embodiment will be illustrated by referring to figures.

Figure 1:
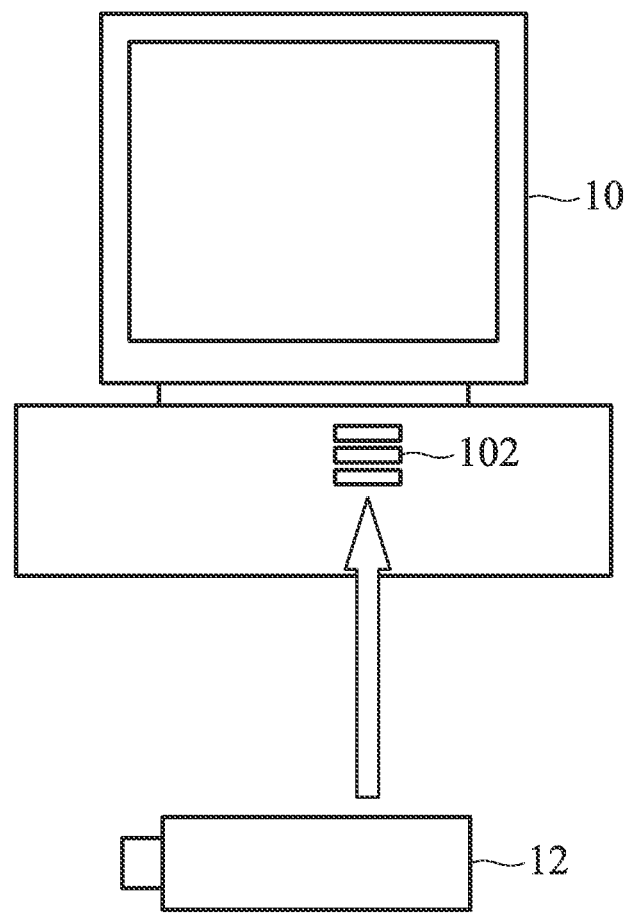
FIG. 1 shows an exemplary embodiment of a system.

Referring to FIG. 1, a first embodiment of the invention is shown.

A computer 10 comprises an USB transmission interface 102 and performs a data access operation to an USB disk 12 through the USB transmission interface 102. The above description is given as an example without limitation for the invention. For example, the computer 10 can be replaced with any other electronic device, such as a mobile phone, a table computer, a television, a camera, or any electronic apparatus requiring data storage. The USB disk 12 can be replaced with any other type of external storage device connected to the computer 10 or an internal storage device within the computer 10. The USB transmission interface 102 can be replaced with another data transmission interface, such as IEEE 1394, SATA, MS (memory stick), MMC (multimedia card), SD (serial data), CF (compact flash), IDE (integrated drive electronics), or PCI (peripheral components interconnect) interface.

An USB disk, an external hard disk, an internal magnetic disk, or a flash disk is given as an example. When the data storage device is connected to an electronic device, such as a computer, through a transmission interface, the electronic device can perform a read operation to the data storage device to determine whether the data storage device is formatted. If the data storage device has not been formatted yet, the electronic device usually asks the user to format the data storage device or not. When the user decides to format the data storage device, the electronic device sends a command to the data storage device, such that the data storage device performs a format operation by itself in response to the command. In another manner, the electronic device provides a detailed control instruction required for the format, to, for example, to build a file table in the data storage device and fill predetermined values.

Figure 2:
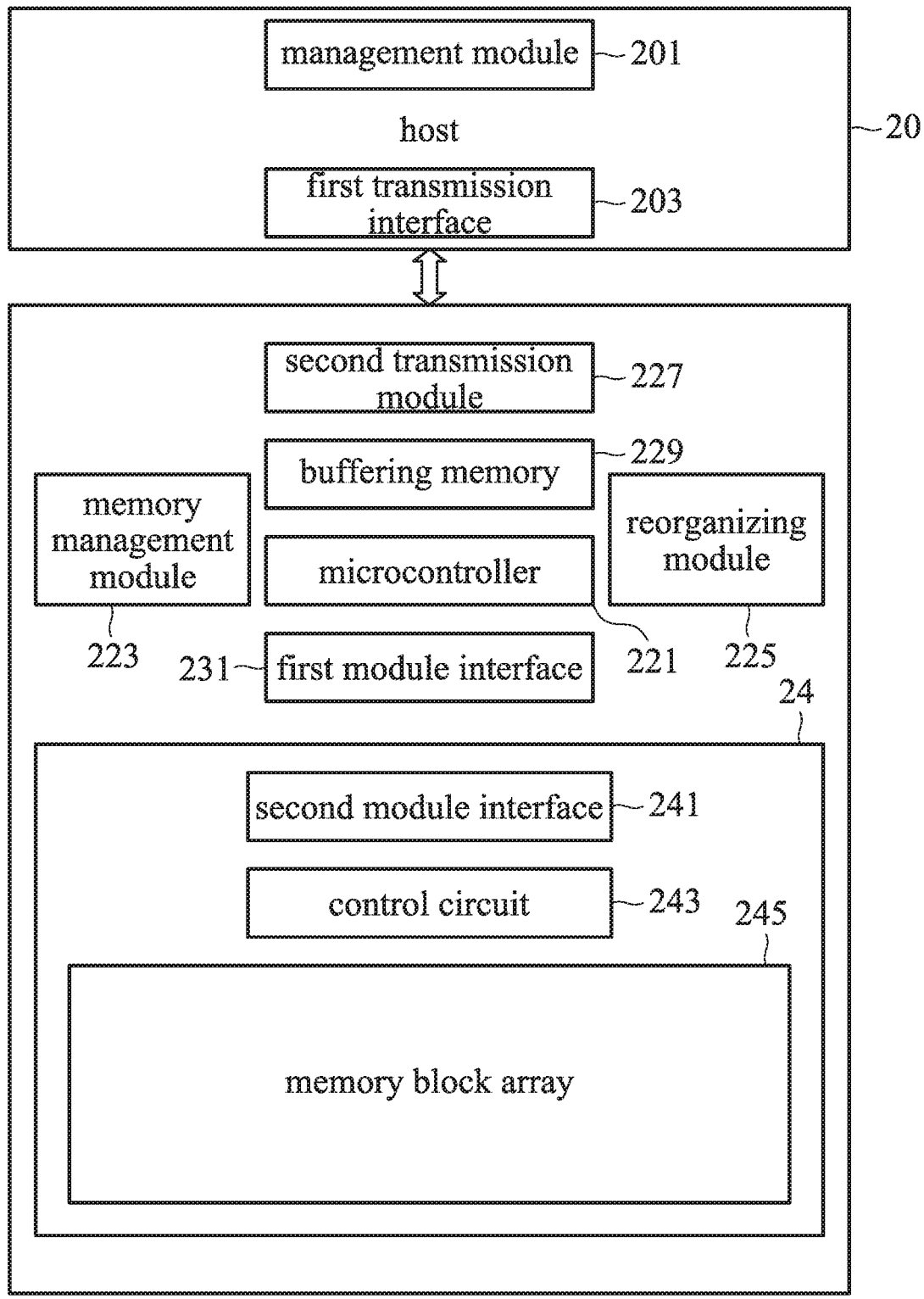
FIG. 2 shows an exemplary embodiment of a detailed structure of devices of FIG. 1.

Referring to FIG. 2, an exemplary embodiment of a detailed structure of the devices of FIG. 1.

A host 20 comprises a management module 201 and a first transmission interface 203. The host 203 accesses a data storage device 22 by hardware, software, or a combination of hardware and software via the first transmission interface 203. The host 20 described herein corresponds to the computer 10 of FIG. 1. In an embodiment, the management module 201 comprises a combination of an operation system, performed on the host, for file and data storage, a corresponding drive program, and related control circuits.

The data storage device 22 comprises a second transmission interface, a microcontroller 221, a buffering memory 229, a memory management module 223, a code reorganizing module 225, and a first module interface 231. The data storage device 22 further comprises a memory module 24. The memory module 224 comprises a second module interface, a control circuit 243, and a memory block array 245.

In the embodiment, the second transmission interface 227 corresponds to the first transmission interface 203 of the host 20, for example, to provide related process of signal transmission in machine and electronic aspect. The buffering memory 229 is used for buffering or cache architecture building during the signal transmission. The entire operation of the data storage device 22 is performed through generating an appropriate control signal by a predetermined instruction code, which is performed by the microcontroller 221, to control the operation of each element at the appropriate time. The memory management module 223 and the reorganizing module 225 may be implemented by circuit hardware or operate according to the instruction code which is assigned to the microcontroller 221 through circuits and performed by the microcontroller 221. In an alternative embodiment, the memory management module 223 and the reorganizing module 225 may be implemented in response to the corresponding instruction code which is performed by the microcontroller 221.

The first module interface 231 is used to communication with the memory module 24. The second module interface in the memory module 24 corresponds to the first module interface 231. The control circuit 243 accesses the memory block array 245 in response to the instruction of the microcontroller 221. The memory block array 245 comprises a plurality of flash memory physical blocks.

The memory management module 223 comprises process logic and a table for intercomparison and recoding the physical blocks and logic blocks. Moreover, the data storage device 22 may further comprise an error correcting module (not shown).

The reorganizing module 225 is responsible for reorganizing the original data which was written into the memory module 24 to generate corresponding reorganized coding data and further reversely reorganize the reorganized coding data which is read from the memory module 24 to revert the value of the original data. The above operation comprises position exchanging of a bit at a specific position, inverting of the bits at a part of the positions, and reverse code reorganizing for the data at the odd address and the even address in different manners.

The objective of the code reorganizing is to achieve data stability. For example, in the flash memory, if the values of the adjacent units are the same, such as both being "0" or "1", the storage stability of the stored data may be influenced due to electronic characteristics. In other words, through the code reorganizing, the values stored in the adjacent units are "0" and "1" in the interlaced pattern, which enhances the storage stability of the data. Thus, if there is a code reorganizing function, the storage quality can be maintained even though flash memories with lower cost are used.

The code reorganizing may be performed for other objectives, for example, for avoiding the data stored in the data storage device from reading by unauthorized users. The code reorganizing can be implemented by any coding manners which have been currently known or will be developed in the future. The manners in which the original data is coded, decode, and then recovered to the original data are within the scope of the code reorganizing.

Figure 3:
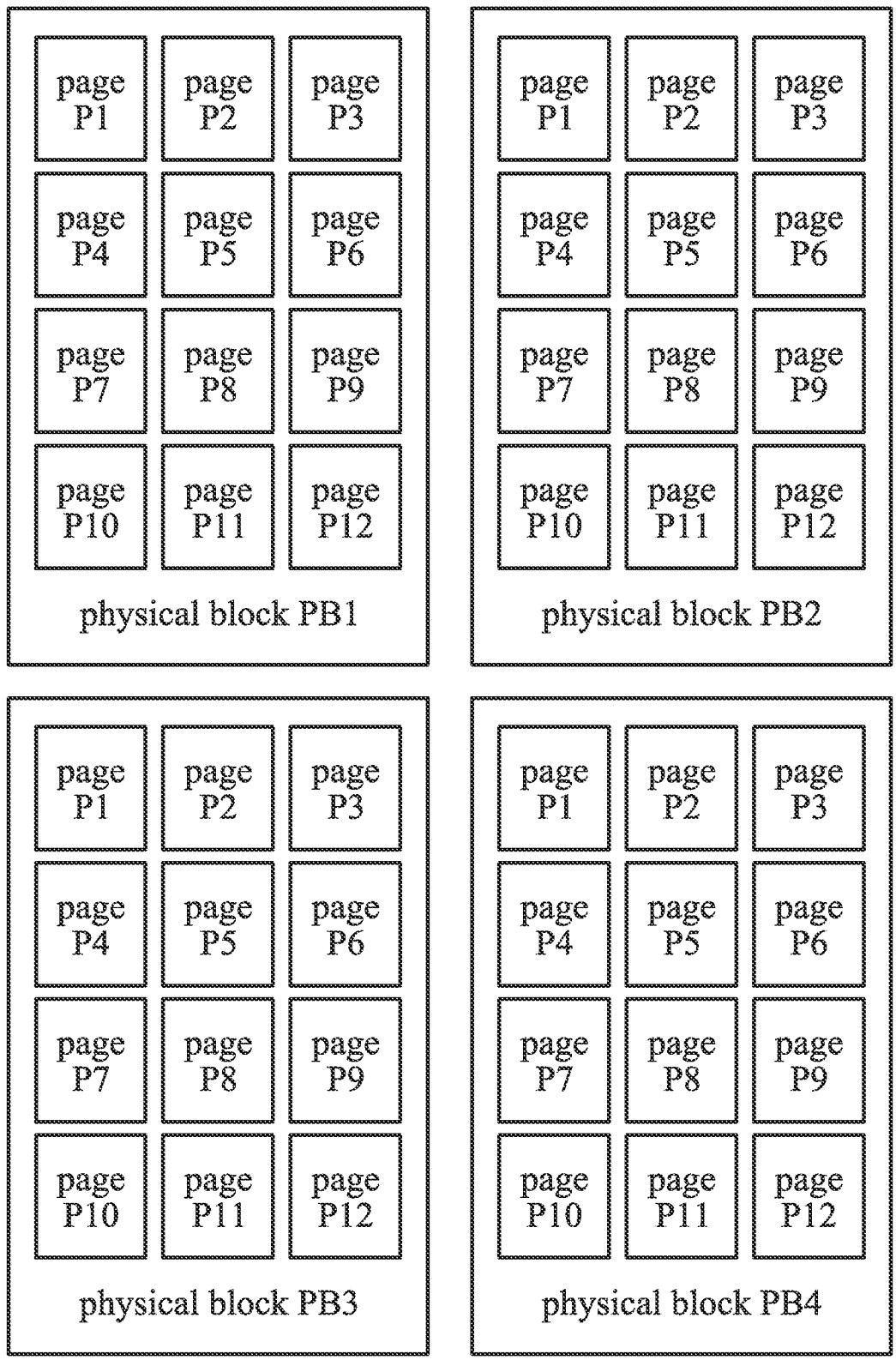
FIG. 3 shows an exemplary embodiment of relationship between the physical blocks and pages.

FIG. 3 shows an exemplary embodiment of the relationship between the physical blocks and pages in the flash memory.

In FIG. 3, there are four physical blocks PB1, PB2, PB3, and PB4. Each physical block is further divided into a plurality of pages P1, P2, P3 . . . P12. In the embodiment, one physical block corresponds to twelve pages. In practical design, the number of pages in one physical block is determined and adjusted according to different requirements. In different applications, the physical blocks and the pages may have different names, or even the physical blocks and the pages are grouped, which have known by one skilled in the art, thus omitting the related description.

For flash memories, such as NAND flash memories or NOR flash memories, before the flash memories which have not used yet operate a write operation, the physical blocks have to be erased. The erasing operation is performed by one unit of one physical block, while the write operation is performed by one unit of one page. The physical blocks which have been erased can perform the data write operation to the expected pages. However, in the case that one certain page has experienced the write operation, if it wants to perform the write operation to the certain page again, the physical block including the certain page has to experience the erasing operation first.

Since the range of the physical block is larger than the range of the page, if the page which has been experienced the write operation will be written again, the data movement has to be performed in advance. In other words, the data at the same address in logic may be moved from one physical block to another physical block during the data write and re-write processes.

Figure 4:
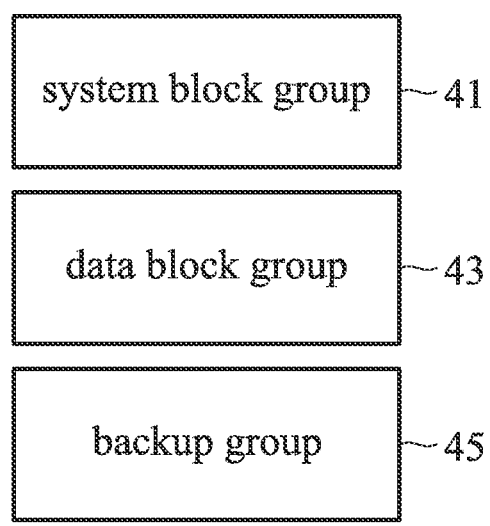
FIG. 4 shows a schematic view showing grouping of physical blocks according to an exemplary embodiment.

FIG. 4 shows a schematic view showing the grouping of physical blocks according to an exemplary embodiment.

Referring to FIG. 1, all of the physical blocks are grouped into three types: a system block group 41, a data block group 43, and a backup block group 45. The system block group 41 is used to store system data, such as the table of the logic blocks and the physical blocks, the instruction codes of the microcontroller, and various indexes. Expect the system block group 41, the data block group 43 comprises the physical blocks which practically store data. The backup block group 45 comprises the physical blocks for data movement and backup.

As described above, when one page which has experienced the write operation will be written again, the erasing operation has to be performed for the one page in advance. In other words, the data of the other page in the physical block where the one page is disposed are also copied to another physical block, which is selected from the backup block group 45, with the data of the one page. After the data is copied to the selected physical block from the backup block group 45, the selected backup block is grouped into the data block group 43, while the original physical block experiences the erasing operation and is grouped into the backup block group 45.

In other words, not only the physical block corresponding the logic address varies all the time, but also the relationship between the physical block and the area varies. Thus, the system has to record the corresponding relationship between the logic blocks and the physical blocks.

Figure 5:
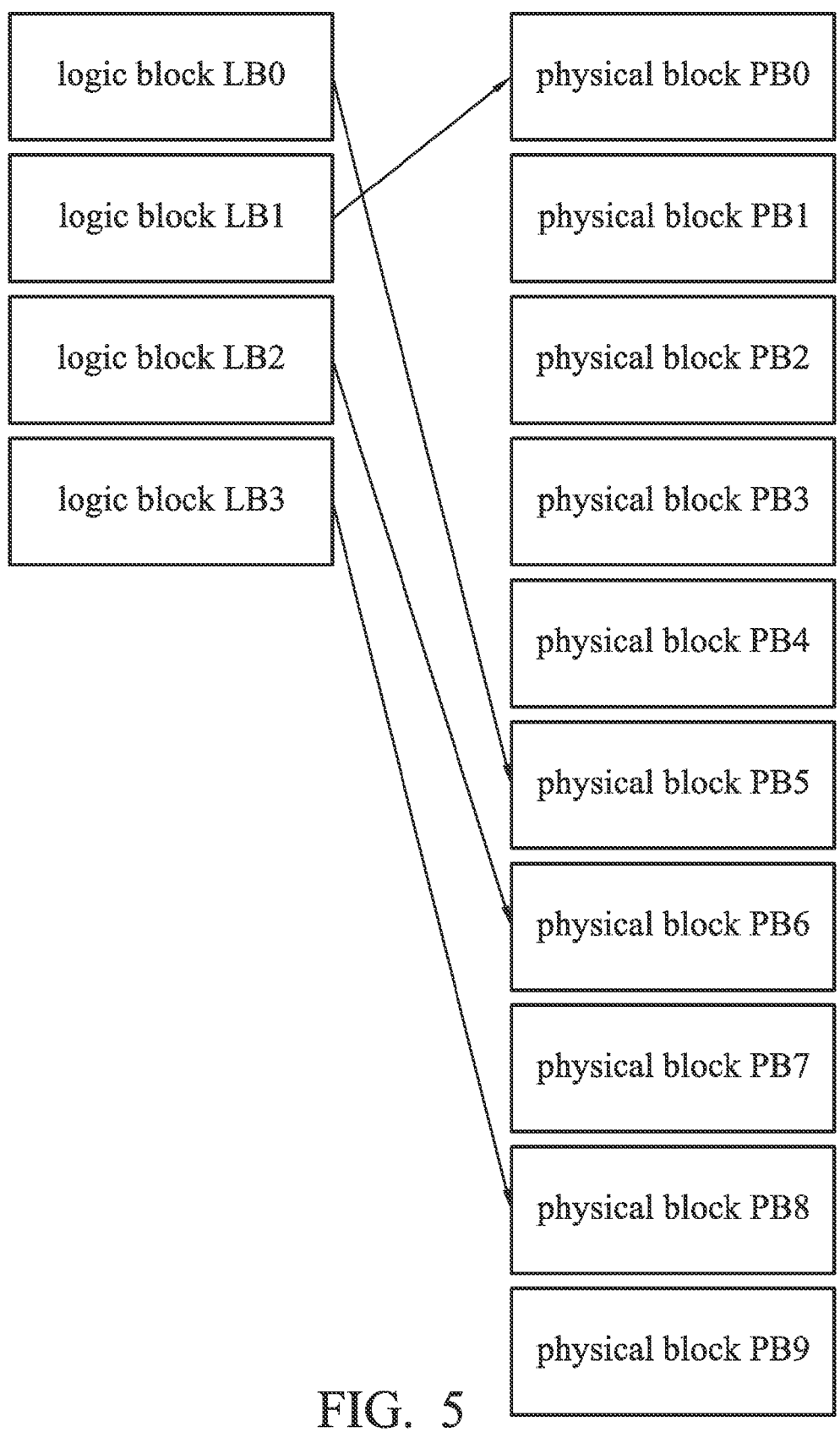
FIG. 5 shows a schematic view showing corresponding relationship between logic blocks and physical blocks by recording in a table according to an exemplary embodiment.

FIG. 5 shows a schematic view showing the corresponding relationship between the logic blocks and the physical blocks according to an exemplary embodiment. In the embodiment, the logic block LB0 corresponds to the physical bock PB5, the logic block LB1 corresponds to the physical bock PB0, the logic block LB2 corresponds to the physical bock PB6, and the logic block LB3 corresponds to the physical bock PB9.

The data storage device may store the above corresponding relationship by tables or other manners.

Figure 6:
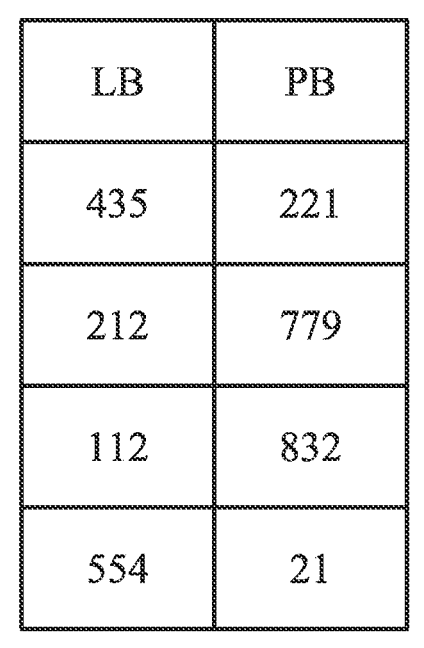

FIG. 6 shows a schematic view showing the corresponding relationship between the logic blocks and the physical blocks which is recorded in a table. In the embodiment of FIG. 6, the logic block 435 corresponds to the physical bock 221, the logic block 212 corresponds to the physical bock 779, the logic block 112 corresponds to the physical bock 832, and the logic block 554 corresponds to the physical bock 21.

Figure 7:
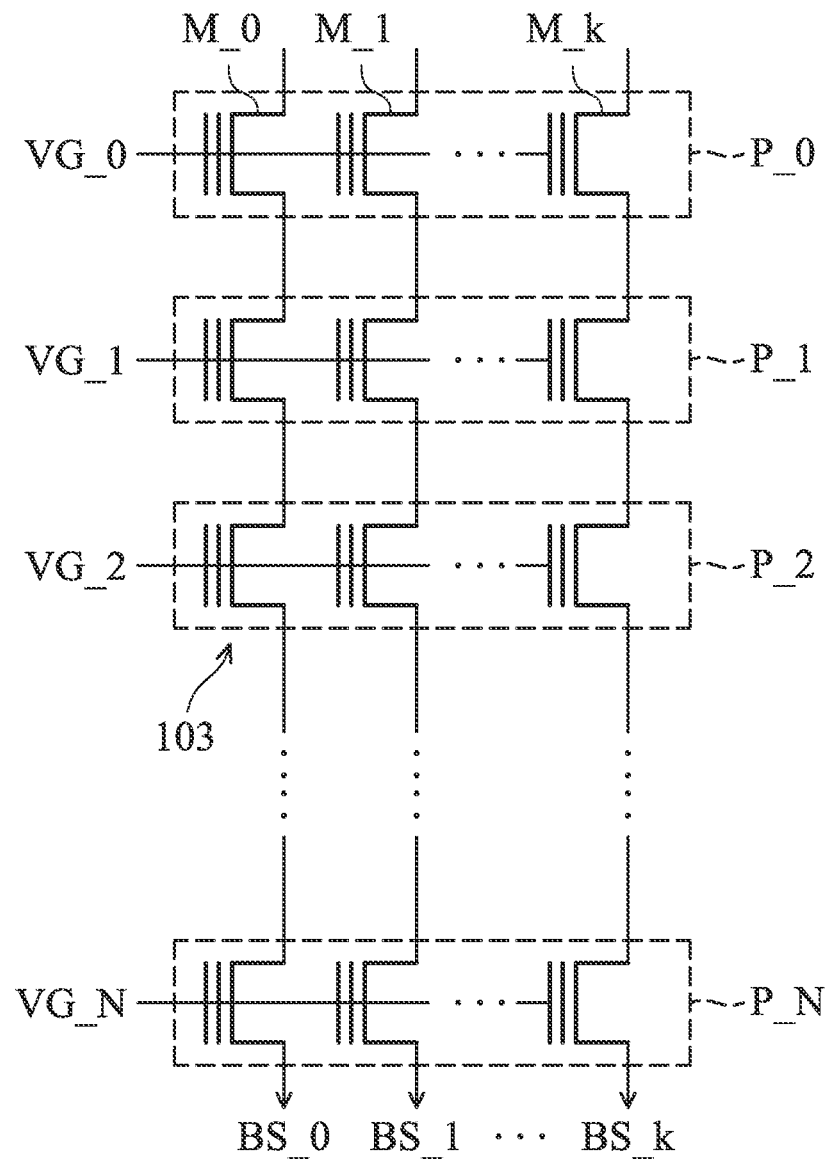
FIG. 7 shows an exemplary embodiment of a block of a memory element of an NAND flash memory.

FIG. 7 shows an exemplary embodiment of a block of a memory element of an NAND flash memory. There are pages with a predetermined number on the block, such as pages $P\_0, P\_1, P\_2, \ldots, P\_N$. Each page comprises a plurality of memory cells $M\_0, M\_1, M\_2, \ldots, M\_K$. Through setting appropriate voltages $VG\_0, VG\_1, VG\_2, \ldots, VG\_N$ respectively to the pages, the potential stored at the floating gate of each memory cell can be readout, thereby obtaining the data stored in each memory cell.

For a single-level cell (SLC) flash memory, each memory cell store data with only one bit, that is "0" or "1". For this case, in theory, how much the charge is stored in each memory cell can be detected by applying appropriate setting voltages $VG\_0, VG\_1, VG\_2, \ldots, VG\_N$ respectively to the pages, and then the value of the corresponding data can be obtained.

In opposition, a multi-level cell (MLC) flash memory, several various setting voltages have to be applied for one read operation to determine how much the charge is stored in each memory cell and then calculate the practice contents stored in the memory cells.

Figure 8:
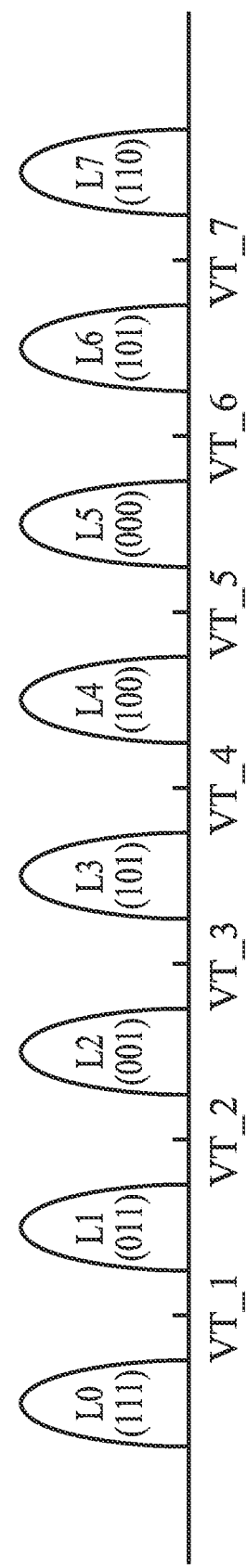
FIG. 8 shows a schematic view showing stored charge and operation voltages of a triple-level cell (PLC) flash memory according of to an exemplary embodiment.

FIG. 8 shows a schematic view showing stored charge and operation voltages of a triple-level cell (PLC) flash memory according to an exemplary embodiment. As shown in FIG. 8, for one memory cell, the stored data is 111, 011, 001, . . . , or 110 respectively when the amount of the stored charge is in the range L0, L1, L2, . . . , or L7.

For this memory cell, in theory, when the operation voltage $VT\_1$ is applied, the detection circuit may detects whether the charge stored in the memory cell belongs to the portion including the range L0 (that is the data "111") or the portion including the ranges L1, L2, L3, L4, L5, L6, and L7 (that is the data "011", "001", "101", "100", "000", "010", or "110").

Through applying combination of several voltages in a specific order, in theory, the data with three bits can be determined, that is the contents of the most signification bit (MSB), the central signification bit (CSB), and the least significant bit (LSB).

However, as described, with the development of the semiconductor manufacturing process toward higher density and with the achievement in lowering the cost and lengthening the usage time of the flash memories, the issue of the stability of the related circuits and memory cells becomes more important.

Figure 9:
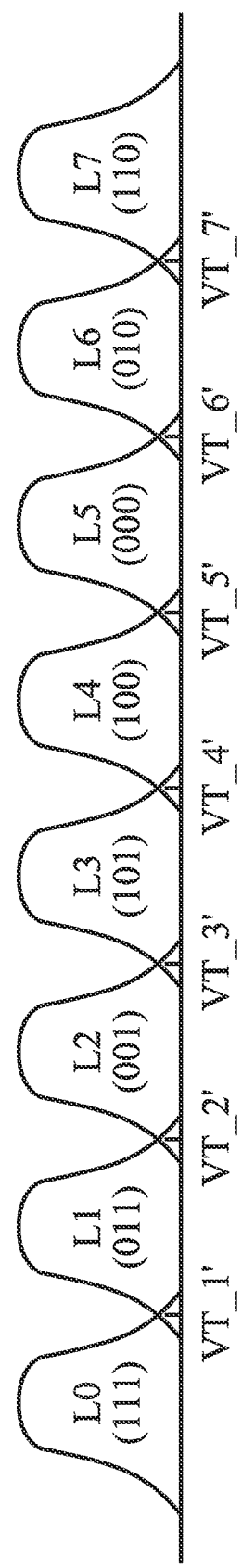
FIG. 9 shows a schematic view showing the case occurs when an operation voltage VT_1 is applied according to an exemplary embodiment.

FIG. 9 shows a schematic view showing the case in which the readout data is not correct when the operation voltage VT_1 is applied to the memory cell due to overlapping or even shift in the states of bits. In this case, for solving the issue of the incorrect data, various error correction manners are required or the operation voltage has to be dynamically adjusted.

Figure 10:
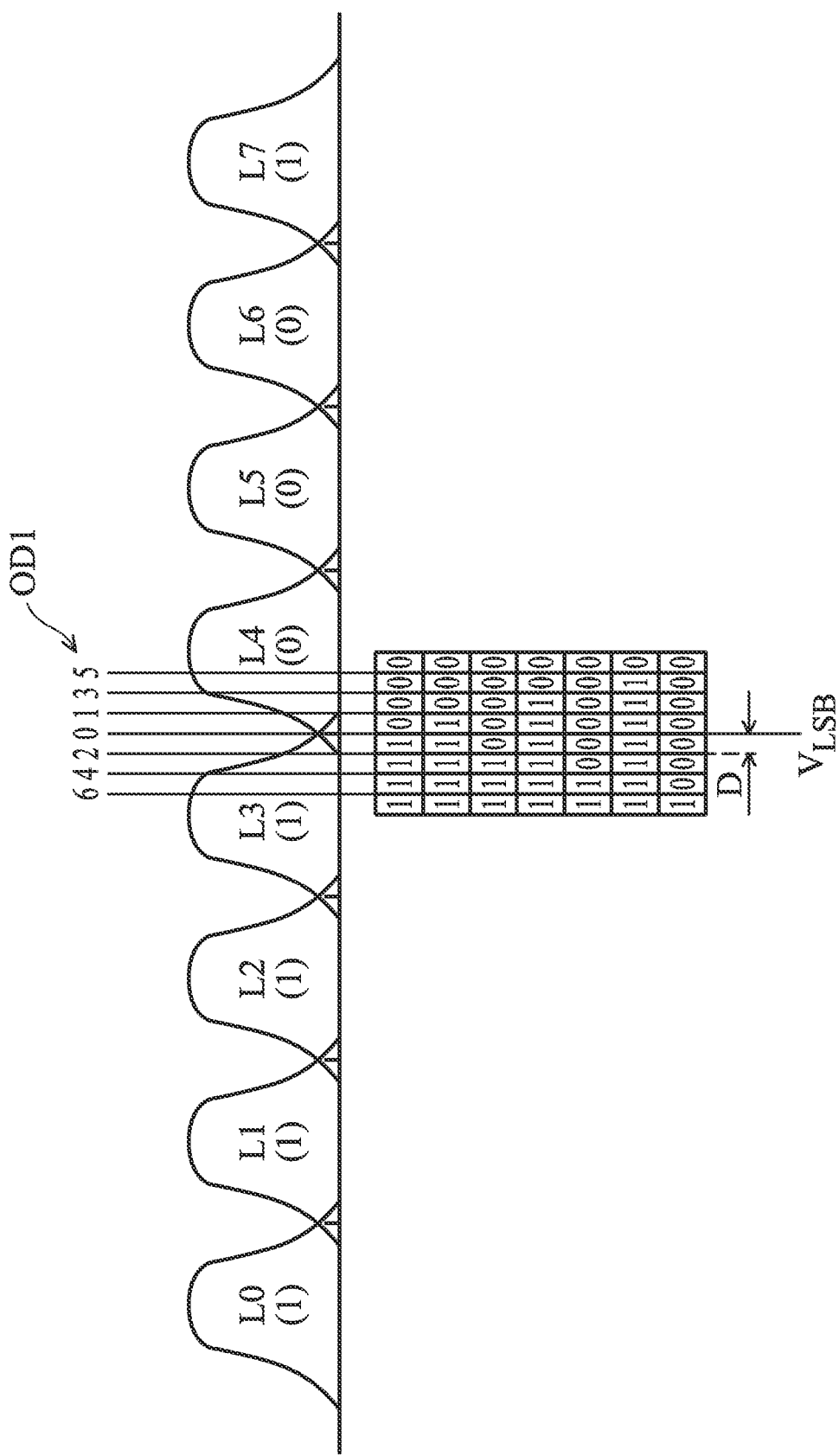
FIG. 10 shows a schematic view showing the case in which one read operation is performed by using seven operation voltages successively according to an exemplary embodiment.

FIG. 10 shows a schematic view showing the case in which the read operation is performed to the memory cell by using seven different voltages and the amount of charge at the floating gate of the memory cell is detected to determine whether the value of the LSB of the data stored in the memory cell is "0" or "1".

As shown in FIG. 10, if the amount of charge stored in the memory cell is on the left side of the voltage VLSB (that is L0, L1, L2, or L3), it represents that the content of LSB is "0". In contrary, if the amount of charge stored in the memory cell is on the right side of the voltage VLSB (that is L4, L5, L6, or L7), it represents that the content of LSB is "1".

Since there is overlapping between the states, the various voltages VLSB, VLSB+D, VLSB−D, VLSB+2D, VLSB−2D, VLSB+3D, and VLSB−3D may be applied successively. Accordingly, if the amount of charge stored in the memory cell is between LSB+D and LSB, certainly significant information can obtained according to the detection result.

The result for one bit can be obtained every time when one voltage applied. Thus, result for seven bits can be obtained by applying voltages by seven times. There are eight possible combinations for the seven buts. The correction code may be calculated and the correct bit data can be fined by the LDPC decoding circuit and manner based on the bit sequence corresponding to the seven bits. That is, the error correction is performed by using the obtained soft information with LDPC and BCH.

Figure 11:
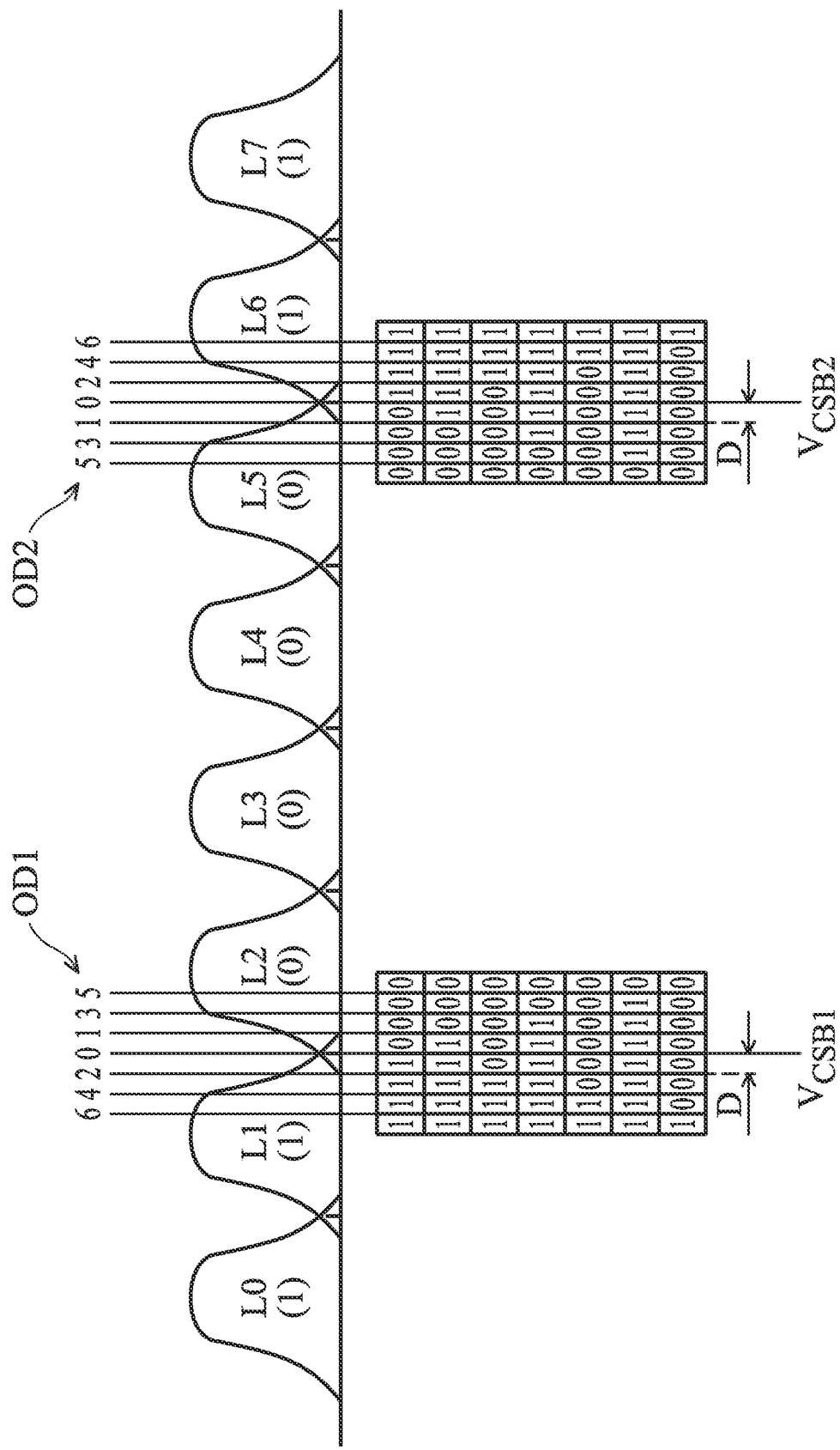
FIG. 11 shows an exemplary embodiment of a method for finding the CSB.

FIG. 11 shows an exemplary embodiment of a method for finding the CSB. CSB represents the second bit. As shown in FIG. 11, if the amount of charge stored in the memory cell is in the range L2, L3, L4, or L5, it represents that the content of CSB stored in the memory cell is "0". In contrary, if the amount of charge stored in the memory cell is in the range L0, L1, L6, or L7, it represents that the content of CSB stored in the memory cell is "1". In this configuration, it can be understood easily that two operation voltages VCSB1 and VCSB2 are required to find which range the amount of charge stored in the memory cell is in.

Similarly, several step adjustment degrees can be applied to the operation voltages VCSB1 and VCSB2, such that the read operation is performed by using different voltages successively. The bit sequence is generated according to the readout result obtained each time. The bit sequence is used to perform the error correction in coordination with LDPC and BCH.

Figure 12:
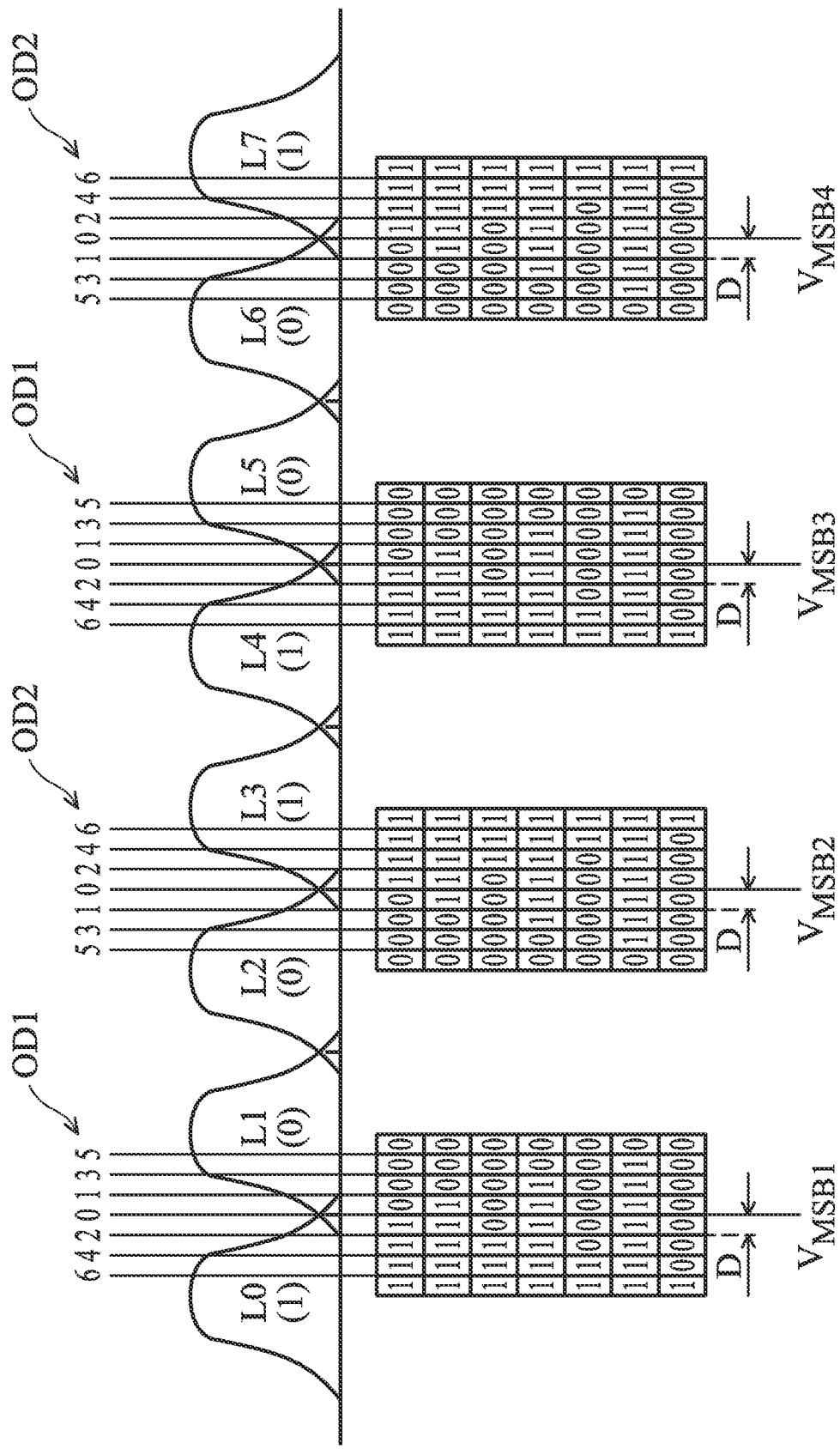
FIG. 12 shows an exemplary embodiment of a method for finding the MSB.

FIG. 12 shows an exemplary embodiment of a method for finding the MSB. MSB represents the highest bit. As shown in FIG. 12, if the amount of charge stored in the memory cell is in the range L0, L3, L4, or L5, it represents that the content of MSB stored in the memory cell is "1". In contrary, if the amount of charge stored in the memory cell is in the range L1, L2, L5, or L6, it represents that the content of MSB stored in the memory cell is "0".

Similarly, several step adjustment degrees can be applied to the operation voltages VCSB1, VCSB2, VCSB3, and VCSB4, such that the read operation is performed by using different voltages successively. The bit sequence is generated according to the readout result obtained each time. The bit sequence is used to perform the error correction in coordination with LDPC and BCH.

After the various structure and configuration is described, a reconfiguration method for the physical blocks during the recovery operation (or recovery process) 14010 (see FIG. 14) after the abnormal status occurs. Of course, the method is not limited to be performed only after the abnormal status occurs.

Figure 13:
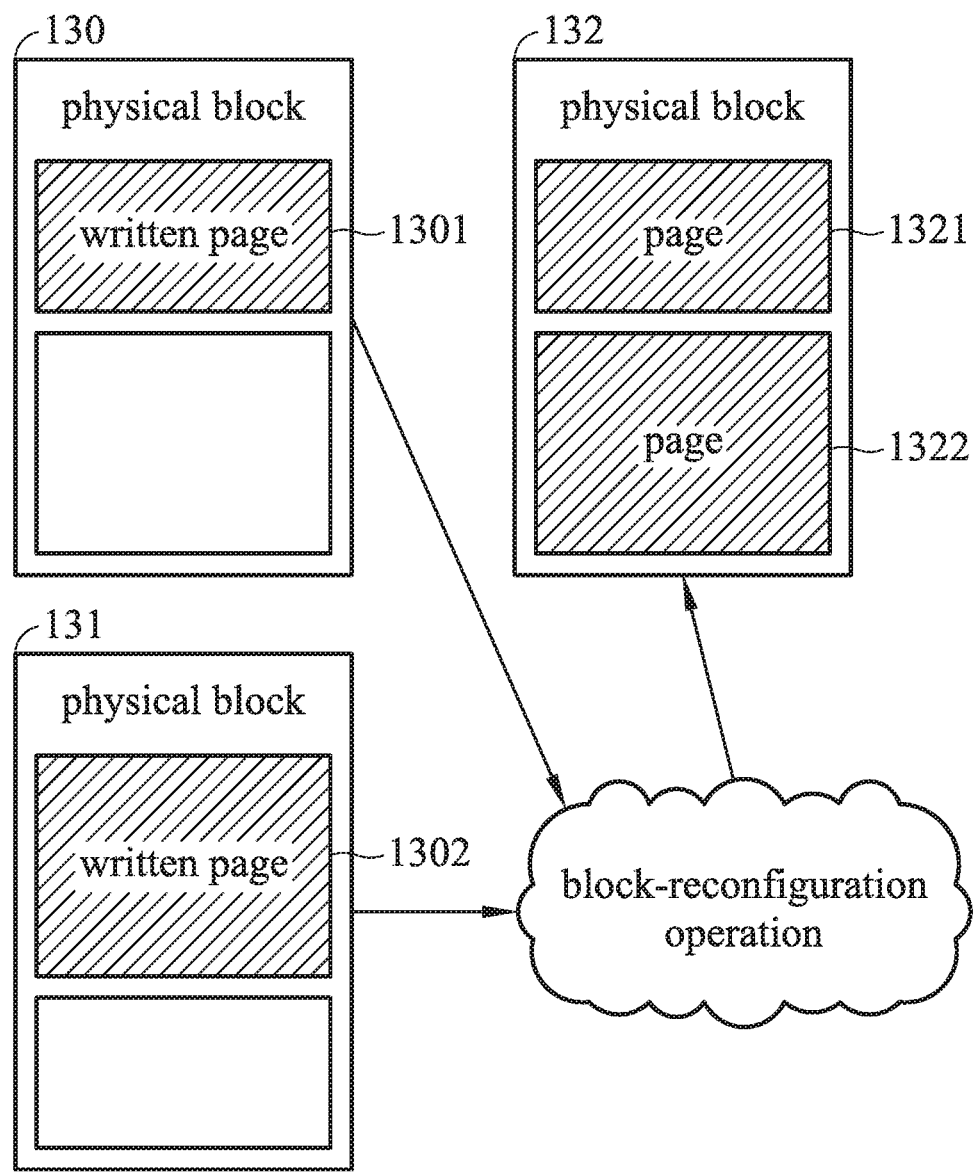
FIG. 13 shows a schematic view showing space reconfiguration for physical blocks.

Referring to FIG. 13, there are two physical blocks 130 and 131. The two physical blocks 130 and 131 are not filled for all pages. The written pages 1301 and 1302 marked by the ablique lines represent a portion which is written by valid data. In order to effectively use the space of the physical blocks, the written pages 1301 and 1302 are combined and written into a new physical block 132 to constitute pages 1321 and 1322. After the data movement is completed, the physical blocks 130 and 131 are released for later write operations.

In other words, after the reconfiguration of the physical blocks is completed, the wastes space is less, and pages are used more effectively. However, data movement performed for this reconfiguration requires longer time. Thus, in the following embodiment, when the controller performs a read or write operation, the data movement which is not completed yet is performed continuously at any spare time.

Figure 14:
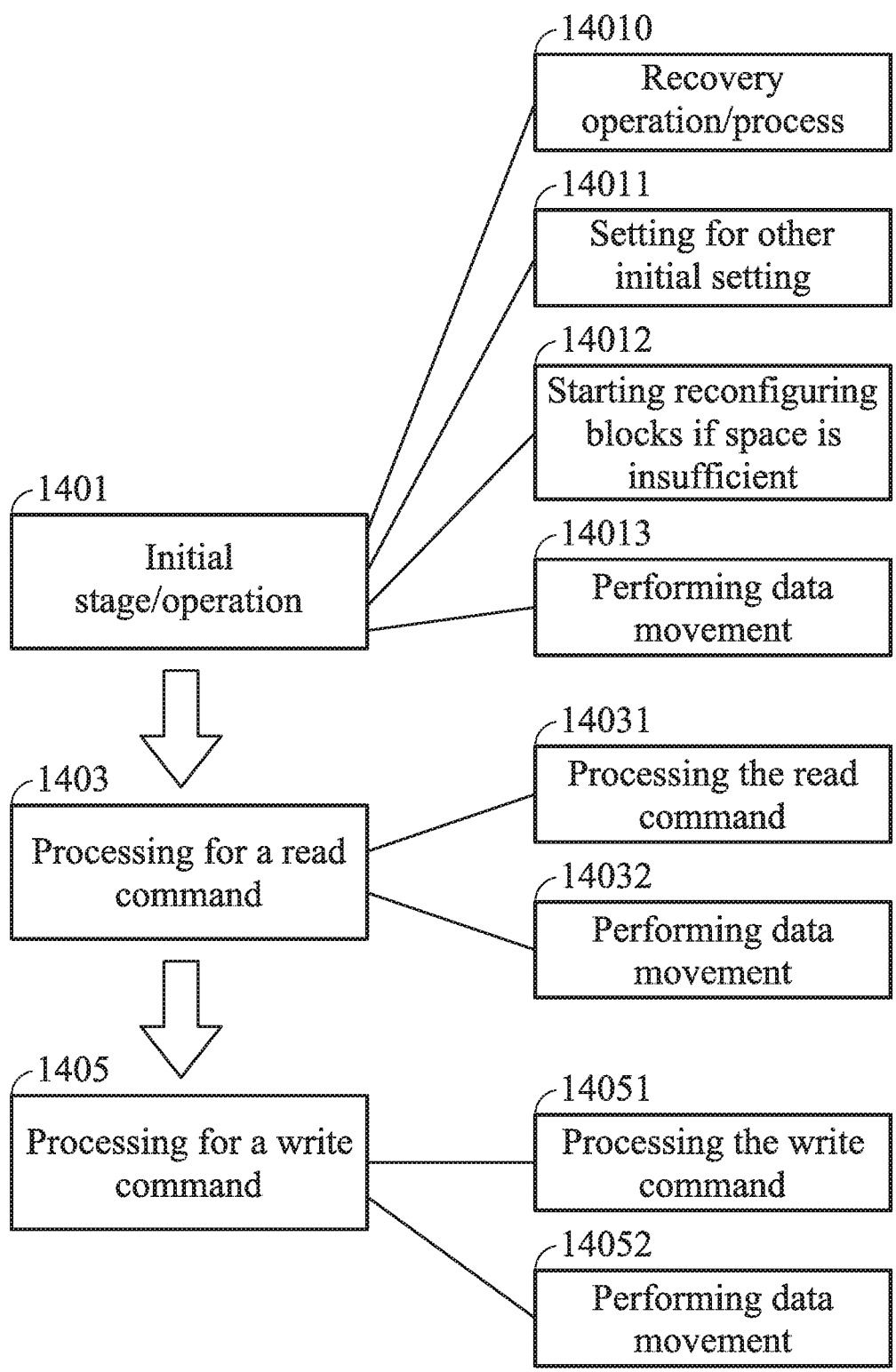
FIG. 14 shows a flow chart of a method for space reconfiguration.

FIG. 14 shows a flow chart of an exemplary embodiment of a space reconfiguration method for physical blocks. When the abnormal statue ends, the controller enters an initial stage (or initial operation) (step 1401). At the initial stage, the controller performs a basic initial setting (step 14011), and the controller also determines whether it is required to start an operation related to the space reconfiguration according to some parameters and statistical values (step 14012). It is required to start the operation related to the space reconfiguration, the controller starts to perform an operation related to movement schedule and data movement (step 14013). In these operations for the space reconfiguration, the process which wastes longest time is the process of data movement. In order to prevent the user from suffering long-time waiting, the controller will leave the initial stage when a predetermined time is achieved. In other words, the use then starts to perform a read/write operation to the storage device.

Then, when the controller receives a read command from a host (such as a computer coupled to the controller), the controller not only processes the read command (step 14031) but also performs the operation of the data movement, which is not completed yet, at an interval period.

Moreover, when the controller receives a write command from the host, the controller not only processes write read command (step 14051) but also performs the operation of the data movement, which is not completed yet, at an interval period.

Through the above method, after the abnormal statue ends, the controller can complete the initial operation as soon as possible. Thus, the user can use the stage device without long-time waiting.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-volatile memory device comprising:
a non-volatile memory divided into a plurality of physical blocks, wherein each physical block is divided into a plurality of physical pages; and
a connection interface connected to a host; and
a controller connected to the connection interface,
wherein when the controller performs a block-reconfiguration operation, the controller re-adjusts a position where data is disposed in the physical blocks to obtain a usable physical block, and
wherein movement of a first portion of the data related to the block-reconfiguration operation is performed when the controller operates an initial operation, and movement of a second portion of the data related to the block-reconfiguration operation is performed when the controller processes a read command from the host.

2. The non-volatile memory device as claimed in claim 1, wherein the controller completes the initial operation in a process time, and the controller performs the movement of the first portion of the data related to the block-reconfiguration operation in remaining time excluding the process time of the initial operation.

3. The non-volatile memory device as claimed in claim 2, wherein in different situations, the initial operation requires different time lengths, and an amount of data related the first portion of the data related to the block-reconfiguration operation is different.

4. The non-volatile memory device as claimed in claim 3, wherein the initial operation comprises a recovery process which is performe for an abnormal status.

5. The non-volatile memory device as claimed in claim 1, wherein movement of a third portion of the data related to the block-reconfiguration operation is perform when the controller processes a write command from the host.

6. The non-volatile memory device as claimed in claim 1, wherein during the block-reconfiguration operation, some physical pages in some physical blocks are found and integrated into one physical block to release usable space in the physical blocks.

7. The non-volatile memory device as claimed in claim 1, wherein the controller records relationship between logic blocks and physical blocks by a table, and the table is updated when the block reconfiguration operation is performed.

8. The non-volatile memory device as claimed in claim 1, wherein after the block reconfiguration operation, the controller selects one physical block to serve as an operation physical block, and when the controller receives a write command from the host, the controller writes data corresponding to the write command into the operation physical block.

9. The non-volatile memory device as claimed in claim 1, wherein the non-volatile memory device is a flash memory.

10. The non-volatile memory device as claimed in claim 1, wherein the non-volatile memory device is a flash hard disk.

11. A control method of a controller for a non-volatile memory device, wherein the non-volatile memory device comprises a non-volatile memory and connection interface, the non-volatile memory is divided into a plurality of physical blocks, each physical block is divided into a plurality of physical pages, the connection interface is connected to a host, and when the controller controls the non-volatile memory device, the control method comprises:
when the controller performs a block-reconfiguration operation, re-adjusting a position where data is disposed in the physical blocks to obtain a usable physical block, and
performing movement of a first portion of the data related to the block-reconfiguration operation when the controller operates an initial operation, and performing movement of a second portion of the data related to the block-reconfiguration operation when the controller processes a read command from the host.

12. The control method of the controller as claimed in claim 11, wherein the controller completes the initial operation in a process time, and the controller performs the movement of the first portion of the data related to the block-reconfiguration operation in remaining time excluding the process time of the initial operation.

13. The control method of the controller as claimed in claim 12, wherein in different situations, the initial operation requires different time lengths, and an amount of data related the first portion of the data related to the block-reconfiguration operation is different.

14. The control method of the controller as claimed in claim 13, wherein when the initial operation comprises a recovery process which is performed for an abnormal status.

15. The control method of the controller as claimed in claim 11, wherein movement of a third portion of the data related to the block-reconfiguration operation is performed when the controller processes a write command from the host.

16. The control method of the controller as claimed in claim 11, wherein during the block-reconfiguration operation, some physical pages in some physical blocks are found and integrated into one physical block to release usable space in the physical blocks.

17. The control method of the controller as claimed in claim 11, wherein the controller records relationship between logic blocks and the physical blocks by a table, and the table is updated when the block reconfiguration operation is performed.

18. The control method of the controller as claimed in claim 11, wherein after the block reconfiguration operation, the controller selects one physical block to serve as an operation physical block, and when the controller receives a write command from the host, the controller writes data corresponding to the write command into the operation physical block.

19. The control method of the controller as claimed in claim 11, wherein the non-volatile memory device is a flash memory.

20. The control method of the controller as claimed in claim 11, wherein the non-volatile memory device is a flash hard disk.

* * * * *